US007127072B2

(12) United States Patent
Rademacher et al.

(10) Patent No.: US 7,127,072 B2
(45) Date of Patent: Oct. 24, 2006

(54) METHOD AND APPARATUS FOR REDUCING RANDOM, CONTINUOUS NON-STATIONARY NOISE IN AUDIO SIGNALS

(75) Inventors: Jan Rademacher, Bremerhaven (DE); Jörg Bitzer, Bremen (DE)

(73) Assignee: Jorg Houpert(DE)

( * ) Notice: Subject to any disclaimer, the term of this patent is extended or adjusted under 35 U.S.C. 154(b) by 759 days.

(21) Appl. No.: 10/044,210

(22) Filed: Dec. 13, 2001

(65) Prior Publication Data

US 2002/0186852 A1 Dec. 12, 2002

(30) Foreign Application Priority Data

Dec. 13, 2000 (DE) ................................ 100 61 957

(51) Int. Cl.
*H04B 15/00* (2006.01)
*G10K 11/06* (2006.01)
*G10L 21/02* (2006.01)

(52) U.S. Cl. ................. 381/94.1; 381/71.1; 381/71.12; 381/94.2; 704/228

(58) Field of Classification Search ............... 381/71.1, 381/71.12, 94.1; 704/238
See application file for complete search history.

(56) References Cited

U.S. PATENT DOCUMENTS 5,852,567 A 12/1998 Xia et al. .................. 395/2.28

OTHER PUBLICATIONS

J. R. Deller, Jr., J. G. Proakis, J. H. L. Hansen, Discrete-timeP-processing of Speech Signals, 1987, Prentice-Hall, Inc., pp. 517-521.*

"Subband Noise Reduction Methods For Speech Enhancement," by Eric J. Diethorn, Microelectronics and Communications Tech. Mar. 2000, ISBN 0-792307814-9.

"Suppression of Acoustic Noise in Speech Using Spectral Subtraction," by Steve F. Boll, IEEE Transactions On Acoustics, Speech, and Signal Process, vol. ASSP-27, No. 2, Apr. 1979.

"Enhancement of Speech Corrupted By Acoustic Noise," by M. Berouti, et al. IEEE ICASSP, p. 208-211.

"Comparison of One- and Two-Channel Noise-Estimation Techniques," by Joerg Meyer, et al. vol. 1 pp. 17-20, Sep. 1997.

"Digitale Sprachsignalverarbeitung," P. Vary, et al, Teubner Verlag, Stuttgart 1998, ISBN 3-519-0616501, pp. 380-390.

* cited by examiner

*Primary Examiner*—Laura A. Grier
(74) *Attorney, Agent, or Firm*—Altera Law Group, LLC

(57) ABSTRACT

There are provided a method and an apparatus for reducing random, continuous, non-stationary noise in audio signals, the noisy audio signal being filtered by means of a predetermined filter function. The filter function is determined dynamically having regard to the current properties of the noisy audio signal and/or its constituent parts, and the filter function is also limited dynamically having regard to the current properties of the noise component contained in the noisy audio signal.

16 Claims, 10 Drawing Sheets

Figure 1:
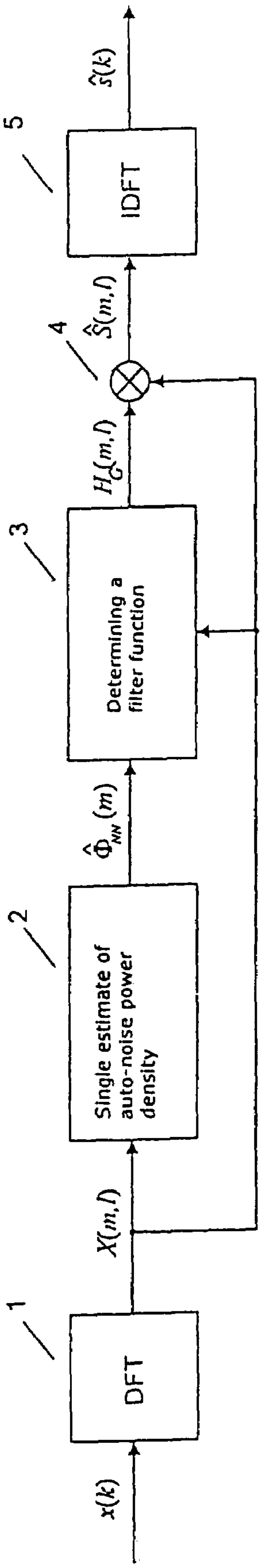
FIG. 1 PRIOR ART

METHOD AND APPARATUS FOR REDUCING RANDOM, CONTINUOUS NON-STATIONARY NOISE IN AUDIO SIGNALS

The invention concerns a method and an apparatus for reducing noise in audio signals, wherein the noise represents a random non-stationary noise value or factor n(k) which at all moments in time k is superimposed on the useful component s(k) of the audio signal x(k). Noise of that kind is referred to hereinafter as random, continuous and non-stationary. In that respect the audio signals are either present in discrete form or they are obtained from sampling an analog, randomly, continuously, non-stationarily noisy audio signal.

Audio signals are often adversely affected by random, continuous, stationary and/or non-stationary interference phenomena or noise—hereinafter for the sake of brevity also referred to as interference noise or noise interference—, which adversely affect the quality of the signal. Usually those interference noises are reduced or removed by filtering the noisy audio signal by means of a filter function in which the filtered output signal is intended to approximate as well as possible to the noise-reduced or non-noisy audio signal. Calculation of the filter function is effected in that respect on the assumption that the noise signal is stationary.

In the context of the present patent application the basic assumption adopted is that the randomly, continuously and non-stationarily noisy discrete audio signal x(k)which came from the sampling of an analog noisy audio signal x(t)at the discrete sampling times k, having regard to the Nyquist theorem, is additively composed of a discrete, undisturbed audio signal s(k), the useful component of the audio signal, and a discrete, random, continuous noise signal n(k), the noise component of the audio signal, wherein n(k)can include stationary and non-stationary noise components:

$$x(k)=s(k)+n(k) \quad (1)$$

A known method of removing or reducing random continuous noises of that kind, the so-called method of 'short time spectral attenuation'—referred to hereinafter for the sake of brevity as Short Time Spectral Attenuation (STSA) is shown in the block circuit diagram of FIG. 1. Shown therein is the processing of an audio signal x(k) which is obtained as a sampling signal x(k) of the analog noisy audio signal x(t) at the sampling times k.

X(m,l),S(m,l) and N(m,l) are the functions corresponding to the discrete signals x(k),s(k), and n(k), for example in the frequency domain, wherein m denotes the discrete frequency. Alternatively however m can be another parameter which permits equivalent description of the discrete time signals x(k),s(k), and n(k). l is the discrete time of the respective signal block being considered, with conventional block-wise signal processing. Therefore the following correspondingly applies in the frequency domain:

$$X(m,l)=S(m,l)+N(m,l) \quad (2)$$

In this known method the discrete audio signal x(k) is transformed in a first step by means of a discrete Fourier transform into the frequency domain, block 1, so that the discrete frequency domain representation X(m,l) is the result. In the illustrated state of the art, that discrete spectral representation affords a single and thus stationary estimate $\hat{\Phi}_{NN}(m)$ of the discrete auto-noise power density $\Phi_{NN}(m)$ by a known estimation process, block 2, which for example involves:

(3a) an estimate of the auto-noise power density within (approximately) useful signal-free passages of the noisy signal, or (3b) a so-called direct estimate.

The estimated discrete auto-noise power density $\hat{\Phi}_{NN}(m)$ comes from a discrete, randomly continuously noisy audio signal in accordance with the process referred to in (3a) by evaluation of approximately audio signal-free passages of the noisy signal, in which as an approximation the following applies:

$$x(k)\approx n(k),\ \text{as}\ s(k)\approx 0. \quad (3)$$

Making use of the linearity of the Fourier transform there is within those portions in which s(k)≈0, an estimate of the discrete auto-noise power density, in accordance with the following:

$$\hat{\Phi}_{NN}(m)=\Phi_{xx}(m) \quad (4)$$

Therein $\Phi_{xx}(m)$denotes the auto-noise power density of the noisy audio signal.

The alternative process (3b) referred to as 'direct estimate' was presented in 'Steven L Gay, Jacob Benesty: *Acoustic Signal Processing for Telecommunication;* Kluwer International Series in Engineering and Computer Science; Chapter 9; Eric J Diethorn: *Subband Noise Reduction Methods for Speech Enhancement,* March 2000, ISBN 0-7923-7814-8' and is based on limitedly tracking the power density of the noisy signal.

In that known process, based on the estimate of the auto-noise power density $\hat{\Phi}_{NN}(m)$ and the discrete frequency domain representation X(m,l)of the discrete audio signal x(k), there is determined a suitable filter function $H_G(m,l)$, see block 3, in which the delivered signal approximates as accurately as possible to the non-noisy audio signal s(k). In this connection various calculation procedures are known for obtaining the filter function $H_G(m,l)$, for example:

(6a) the approach in accordance with Wiener, in which the mean quadratic error between useful signal and estimate is used as the approximation criterion, or (6b) the approach relating to amplitude subtraction, or (6c) the approach relating to power subtraction which are described in 'S F Boll; *Suppression of acoustic noise in speech using spectral subtraction;* IEEE Trans Acoust, Speech & Signal Process.; ASSP-27, pages 113–120; 1979', and also in the textbook by P Vary, U Heute & W Hess '*Digitale Sprachsignalverarbeitung'*, Teubner Verlag, Stuttgart 1998, ISBN 3-519-06165-1, pages 380–390.

Determining an estimate ŝ(k) of the discrete non-noisy useful component s(k) involves effecting filtering of the discrete audio signal x(k) with the previously determined filter function. That can be implemented either in the time domain by convolution of the discrete noisy signal x(k) with the discrete pulse response of the filter function $h_G(k)$:

$$\hat{s}(k)=h_G(k)*x(k), \quad (5)$$

wherein * represents the convolution operator or as shown in FIG. 1 in the frequency domain by multiplication of the discrete transfer function $H_G(m,l)$ with the discrete spectral representation X(m,l) of the discrete noisy audio signal x(k,l), see block 4:

$$\hat{S}(m,l)=H_G(m,l)\cdot X(m,l). \quad (6)$$

Using the discrete estimate $\hat{S}(m,l)$ determined in that way, the corresponding representation ŝ(k) is obtained therefrom in the time domain by the inverse discrete Fourier transform, see block 5, so that the noise-freed signal can be converted, possibly by means of a digital-analog converter, into an analog, noise-freed signal.

A disadvantage of that known method is that the operation of filtering the noisy audio signal causes noise to be again introduced into the noise-freed signal, which occurs due to the filtering operation and results in unwanted so-called 'musical tones'.

In addition, 'M Berouti, R Schwartz & J Makhoul: *Enhancement of speech corrupted by acoustic noise;* in Proc. IEEE ICASSP; page 208–211; Washington D.C.; 1979' discloses a further method which is described hereinafter with reference to the block circuit diagram of FIG. 2 and which corresponds in terms of its basic principle to the method shown in FIG. 1. That known method operates in the following manner:

Taking a single and thus stationary estimate of the auto-noise power density $\hat{\Phi}_{NN}(m)$, block 2, and the discrete signal representation X(m,l)at the output of the block 1 of the discrete audio signal x(k),the filter function $H_G(m,l)$ is ascertained therefrom, block 3. Prior to the actual filtering of the noisy signal, block 4, the filter function $H_G(m,l)$ is limited to a constant, freely selected minimum value $\gamma_{SF}(m)$—also referred to as the 'spectral bottom'—, that is to say a maximum noise reduction, block 6. That therefore affords for the filtering operation a new discrete filter function $H_G(m,l,\gamma_{SF}(m))$, for which the following applies:

$$H_G(m, l, \gamma_{SF}(m)) = \begin{cases} H_G(m, l) & \text{for } H_G(m, l) > \gamma_{SF}(m) \\ \gamma_{SF}(m) & \text{other} \end{cases} \tag{7}$$

That limited filter function means on the one hand that no freedom from noise but only a reduction in interference is possible, while on the other hand the occurrence of so-called musical tones is markedly reduced.

The discrete, noise-reduced signal spectrum $\hat{S}(m,l)$ obtained by the filtering operation, block 4, is then transferred back into the time domain as in the method shown in FIG. 1 by inverse discrete Fourier transform, block 5.

Both known methods are found to suffer from the disadvantage that they can only be used for the removal or reduction of random, continuous, stationary and possibly random, continuous, slowly non-stationary noise. Changes in respect of time of the statistical properties of the discrete noise n(k) cannot be detected or can be detected only in the case of very slow changes. If however the superimposed interference involves for example a non-stationary noise, that affords an error-inflicted estimate of the auto-noise power density. That results in defective determination of the filter function and thus a noise reduction which either adversely affects the actual non-noisy signal s(k) and/or only insufficiently reduces the noise signal n(k).

When using a one-off and thus stationary estimate of the auto-noise power density within useful signal-free portions, there is a defective auto-noise power density as a random continuously disturbed audio signal generally does not have sufficiently many useful signal-free portions which permit continuous updating of the estimate of the auto-noise power. This means that the estimate value ascertained cannot take account of the changes in respect of time of the statistical properties of the noise. Admittedly, with the above-discussed and known 'direct estimate' the auto-noise power density is continuously updated, but the estimate is defective in respect of the non-stationary noise component, as is shown by the considerations in that respect in 'J Meyer, K U Simmer and K D Kammeyer: *Comparison of One- and Two-Channel Noise-Estimation Techniques; Proc 5th International Workshop on Acoustic Echo and Noise Control* (*IWAENC*-97), Vol 1, pages 17–20, London, UK 11–12th September 1997'.

U.S. Pat. No 5,852,567 discloses a further method of reducing random continuous noise. Based on a time-frequency transform the endeavour with that method is to improve the signal-noise ratio and the characteristics of the non-stationary useful signal. As in the methods described hereinbefore, this method is also found to suffer from the disadvantage that, in accordance with its development aim, it can also only be used for reducing random continuous stationary noise but not for reducing random continuous non-stationary noise.

Therefore the object of the invention is to provide a method and an apparatus for producing random continuous non-stationary noise, with the aim of reducing the non-stationary noise component in the audio signal in relation to the stationary noise component thereof.

That object is attained by a method as set forth in claim 1. In addition that object is attained by an apparatus as set forth in claim 11.

The advantages of the method according to the invention and the apparatus according to the invention are that a representation of the noisy audio signal is processed in such a way that the changes in respect of time of the statistical properties of the noise component of the processed audio signal are reduced in comparison with the noise component of the unprocessed audio signal. The changes in respect of time of the statistical properties are reduced so that after processing the audio signal is only still adversely affected by a random continuous stationary residual noise and possibly a further reduction in the average noise level can additionally be implemented. When determining the filter function the current properties of the useful and the noise signal component are taken into consideration. The degree of the reduction in noise, that is to say the filter function, is not restricted to a fixed amplitude value but is dynamically adapted to the current, time-variable properties of the noise signal, by a representation of the interference noise or a parameter which can be derived directly or indirectly therefrom.

In accordance with a particularly preferred embodiment of the invention it is possible to ascertain a representation of the noise, which describes the changes in respect of time of the non-stationary statistical properties of the noise.

A further crucial advantage of the method according to the invention is the incorporation of the current noise signal properties. Previous methods take account in that connection only of a signal section which is limited in respect of time, so that no consideration was given to the changing properties of the noise signal component.

Advantageous developments of the invention are characterised by the features of the appendant claims.

Figure 2:
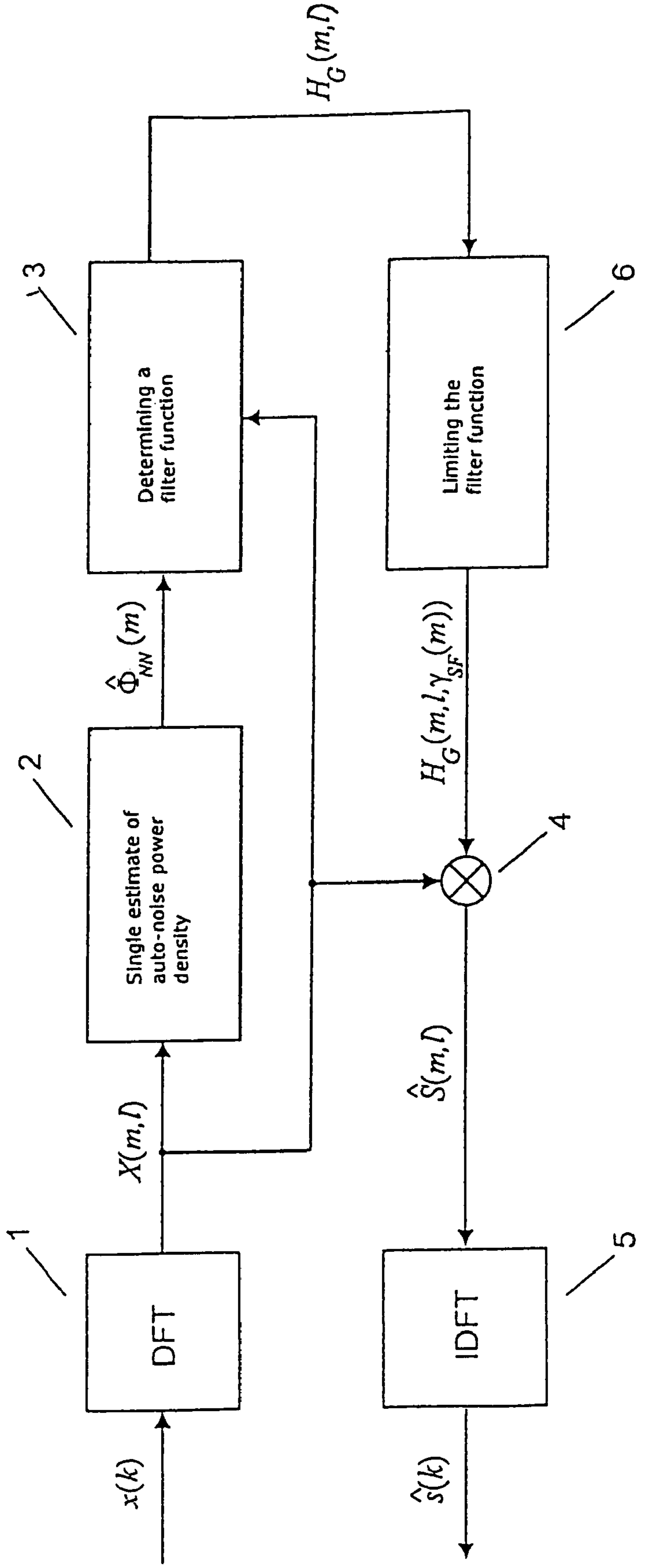
FIG. 2 PRIOR ART
Figure 3:
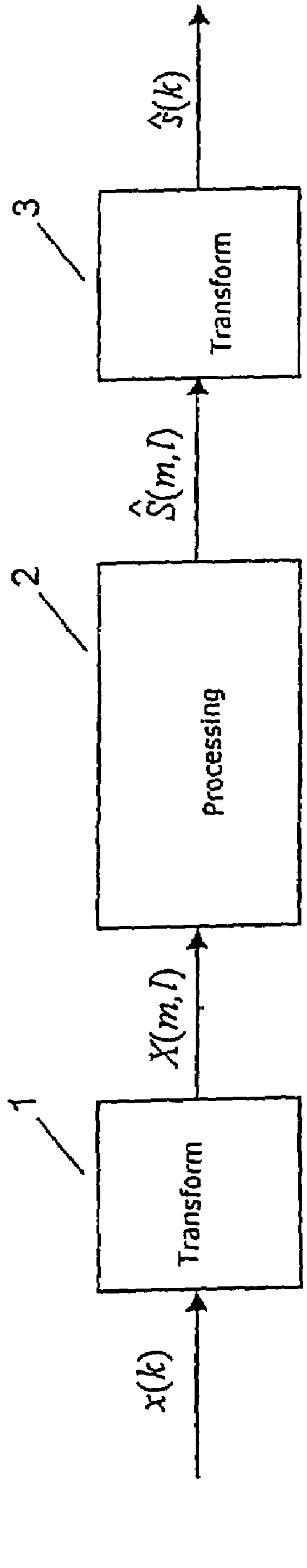
Figure 4:
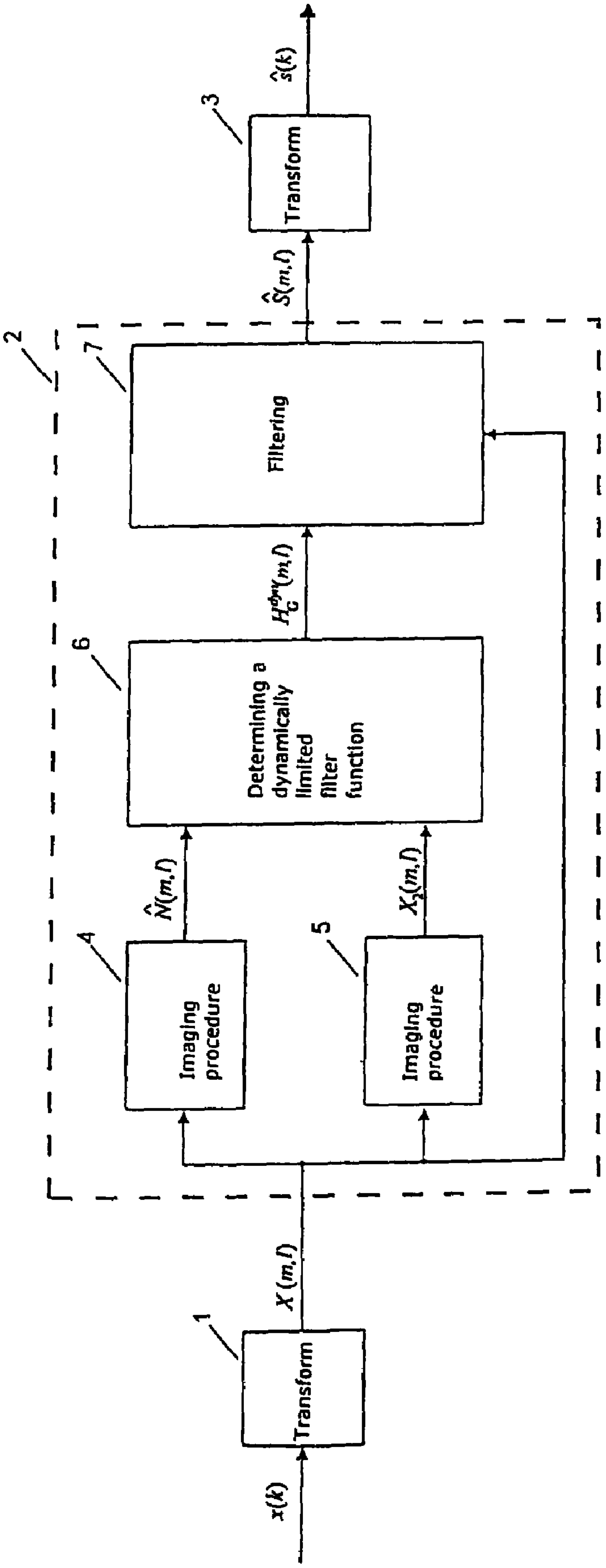
Figure 5:
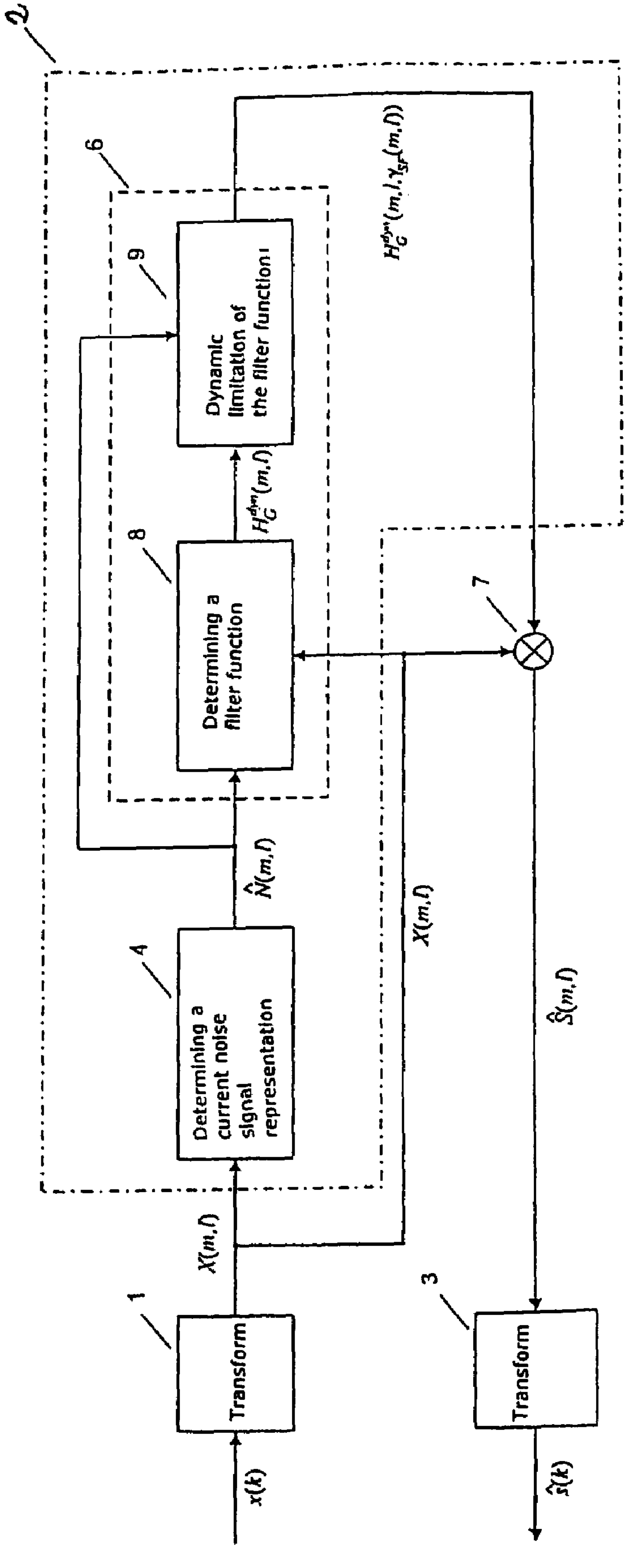
Figure 6:
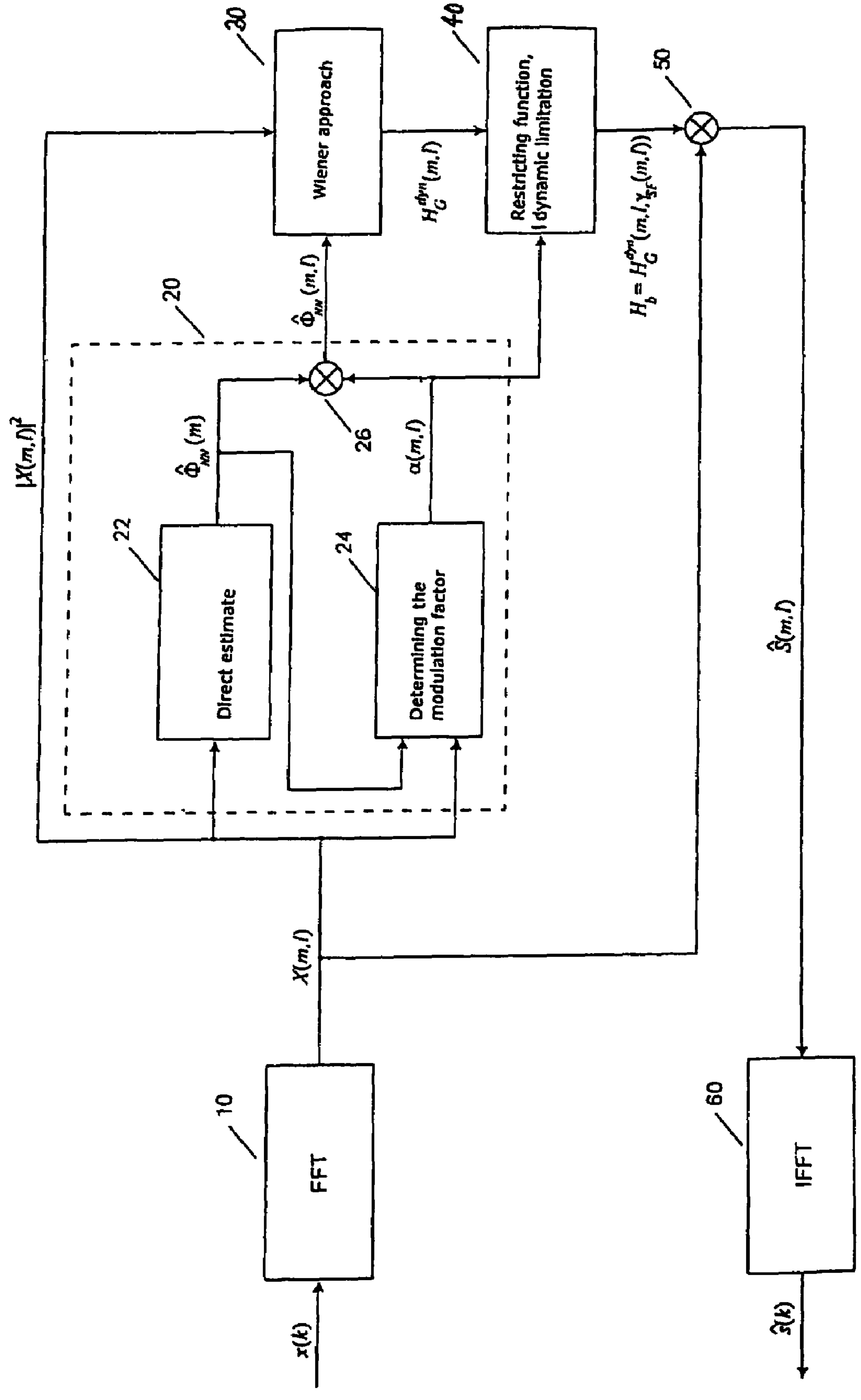
Figure 7:
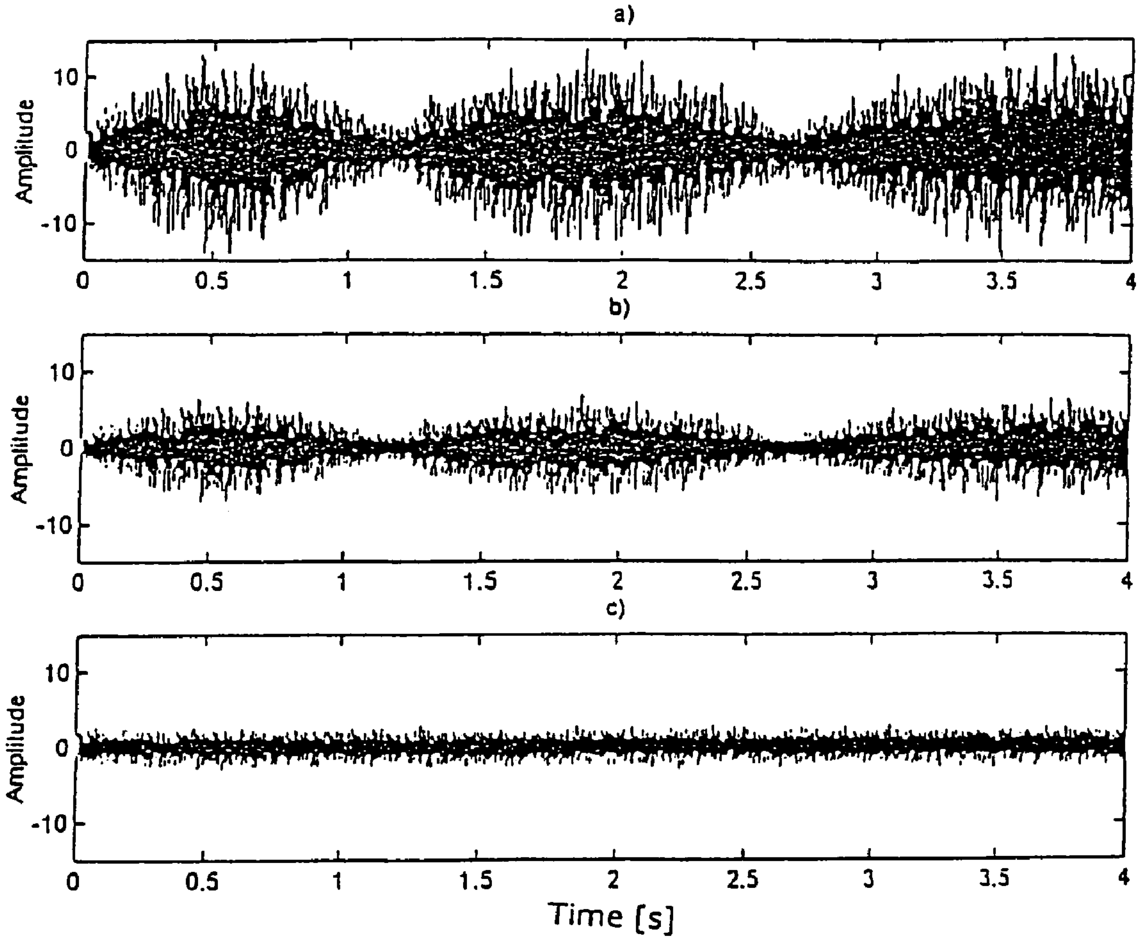
Figure 8:
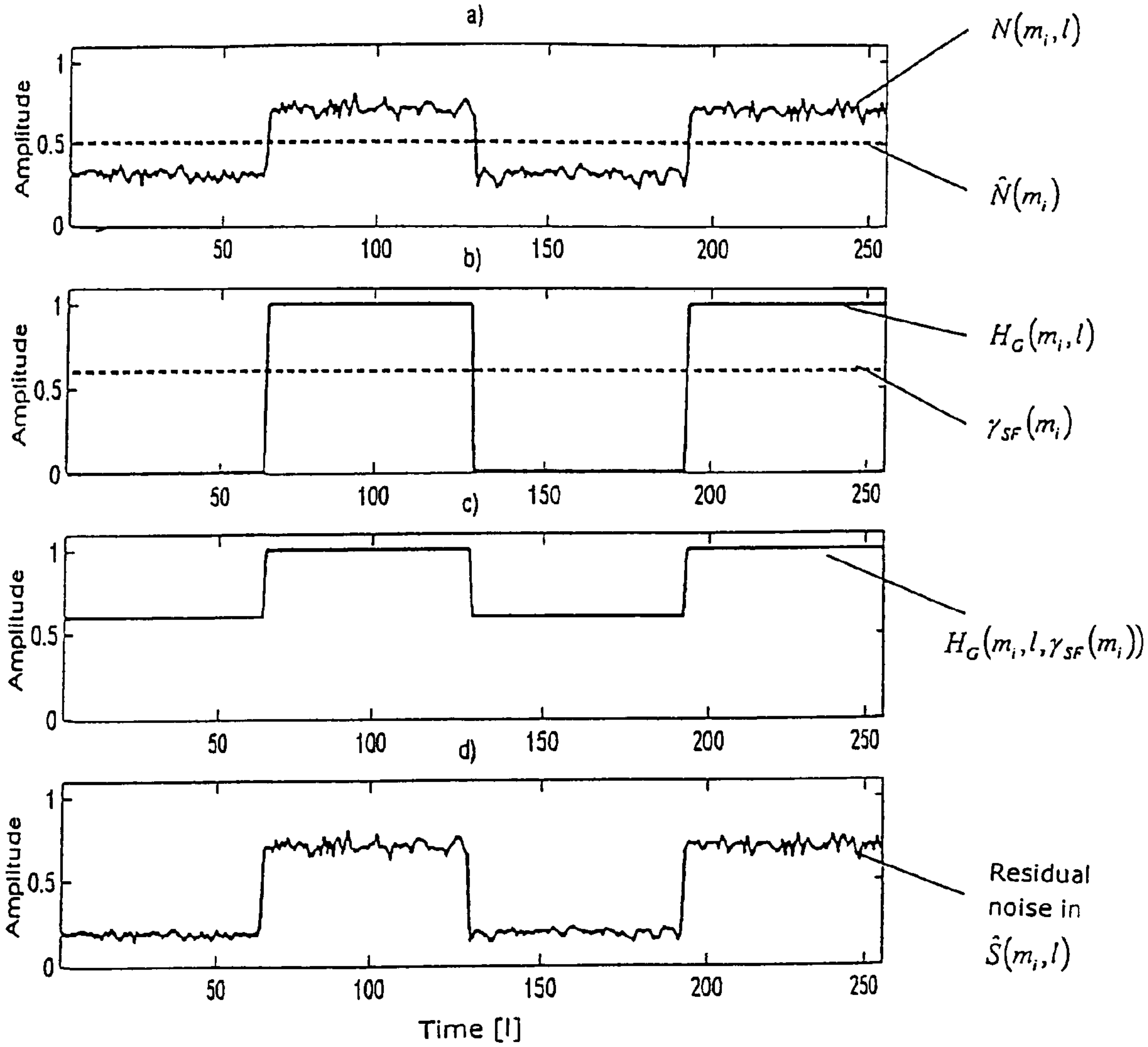
Figure 9:
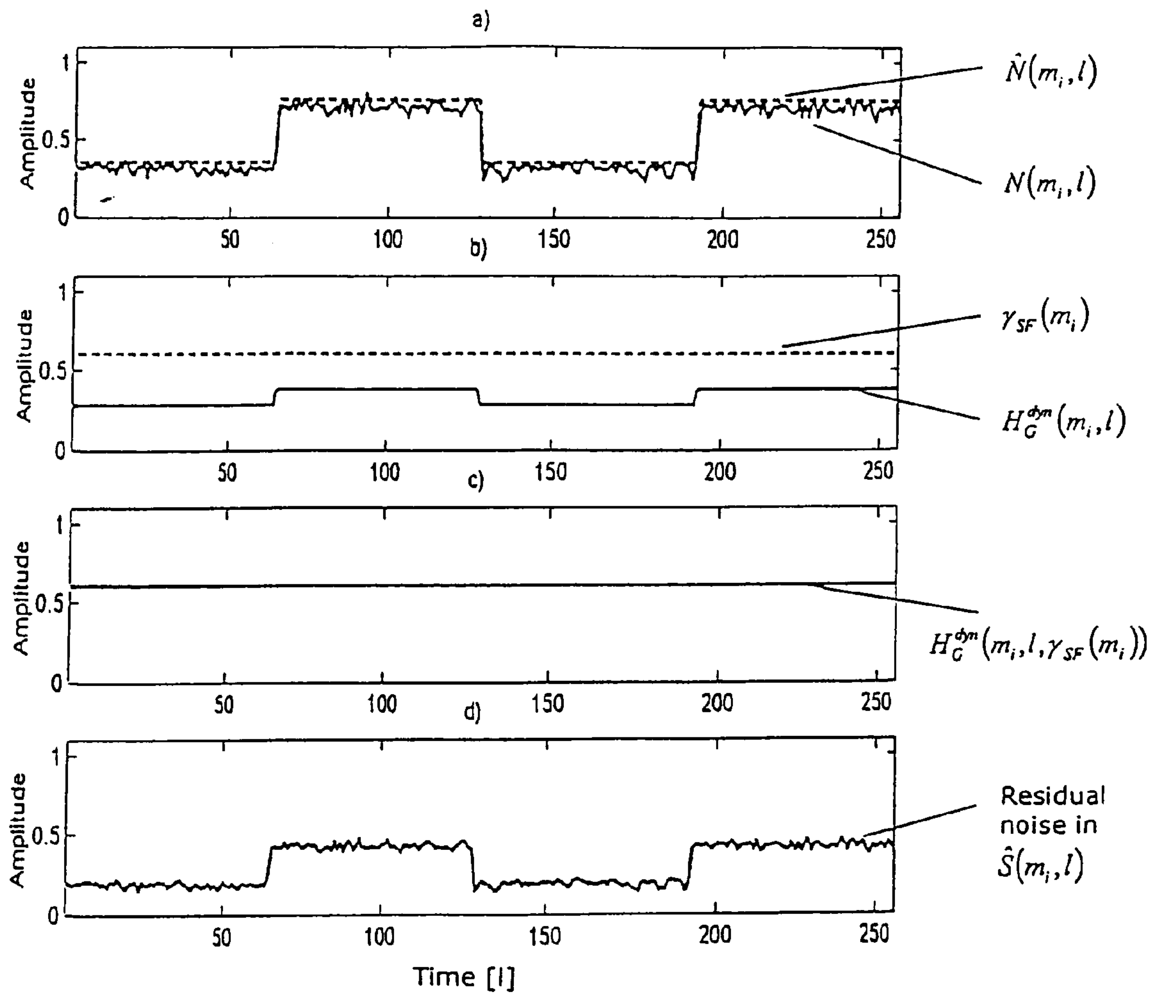
Figure 10:
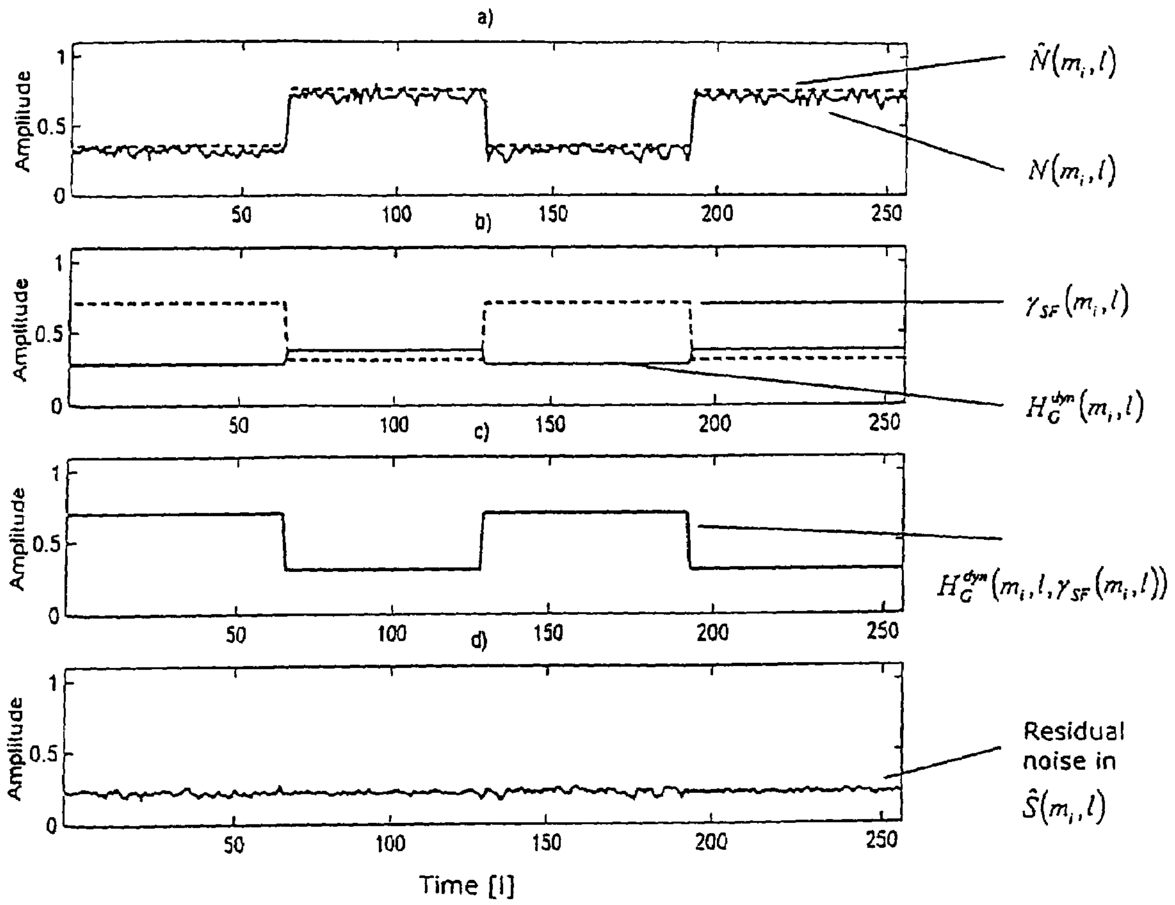

Embodiments of the invention are described in greater detail hereinafter with reference to the drawing in which:

FIG. 1 shows a block circuit diagram of a known method of reducing random continuous noise in audio signals, FIG. 2 shows a block circuit diagram of a further known method of reducing random continuous noise in audio signals, FIG. 3 is a diagrammatic representation of the method according to the invention, FIG. 4 is a block circuit diagram of a first embodiment of the method according to the invention, FIG. 5 is a block circuit diagram of a second embodiment of the method according to the invention, FIG. 6 is a block circuit diagram of a third embodiment of the method according to the invention, FIGS. 7*a* through 7*c* show the typical configuration in respect of time of the noise component a) of a noisy audio signal, b) of the audio signal processed in accordance with the state of the art, and c) of the audio signal processed with the method according to the invention, FIG. 8 is a representation by way of example of the mode of operation of the method shown in FIG. 2, FIG. 9 is a diagrammatic view of the mode of operation of an embodiment of the known method when using an estimate of the currently contained noise signal component which describes the change in respect of time of the noise for determining the filter function $H_G^{dyn}(m,l)$ and the restriction thereof by means of a restriction function $\gamma_{SF}(m)$ which is constant in respect of time, and FIG. 10 is a representation by way of example of the mode of operation of an embodiment of the method according to the invention.

FIGS. 3 and 4 show a diagrammatic block circuit diagram of a first embodiment of the method according to the invention. In accordance with the block circuit diagram shown in FIG. 3, the procedure involves determining from a discrete noisy audio signal x(k) by a suitable transform, for example a transform of the signal x(k) into the frequency domain, an associated representation X(m,l) of that audio signal, block 1. The variable l describes in this connection the current observation time. That representation is processed in a processing unit 2. The processing of that representation, in accordance with the method of the invention, affords the processed new representation $\hat{S}(m,l)$ of the audio signal which is characterised by a reduction in the changes in respect of time of the statistical properties of the contained noise component. Finally then by suitable reverse transformation the discrete signal configuration $\hat{s}(k)$ is obtained, which describes the discrete configuration in respect of time of the noise-reduced audio signal as a function of the discrete sampling times.

As shown in FIG. 4 a suitable filter function $H_G^{dyn}(m,l)$ is determined from the representation of the noisy audio signal $X_2(m,l)$—which for example is afforded by a suitable imaging procedure from the representation X(m,l) and which represents the signal x(k) transformed from the time domain into the frequency domain—see block 5, and the representation $\hat{N}(m,l)$ which represents an estimate of the current properties of the noise signal component in the frequency domain, in known manner, utilising the estimate $\hat{N}(m,l)$ of the noise component of the audio signal. In addition, utilising the estimate $\hat{N}(m,l)$ of the noise component of the audio signal, the filter function $H_G^{dyn}(m,l)$ ascertained in that way is restricted dynamically, that is to say in dependence on time, see blocks 4 and 6. The superscript dyn characterises a filter function which is obtained by incorporating the current properties of the non-stationary noise component of the audio signal.

In a further processing step the representation X(m,l) of the noisy audio signal x(k) is filtered with the restricted filter function, see block 7, thus affording a processed discrete signal $\hat{S}(m,l)$ That representation $\hat{S}(m,l)$, by means of suitable reverse transform, affords a discrete signal configuration $\hat{s}(k)$ which corresponds to the discrete configuration in respect of time of the noisy audio signal x(k), but is characterised by a smaller change in respect of time of the statistical properties of the contained noise.

FIG. 5 shows the block circuit diagram relating to the implementation of a second embodiment of the method according to the invention. The procedure involves ascertaining from the discrete noisy audio signal x(k) at the respective observation time l, for example by a Fourier transform, a suitable representation X(m,l) of that audio signal, see block 1. Obtained therefrom is an estimate $\hat{N}(m,l)$ of the non-stationary random and continuous noise component n(k) which is superimposed on the non-noisy discrete audio signal s(k), see block 4, which describes the current statistical properties of the non-stationary noise. Using the estimate $\hat{N}(m,l)$, a suitable filter function $H_G^{dyn}(m,l)$, see block 8, which in contrast to the known methods takes account of the non-stationary nature of the interference component, is ascertained utilising the representation of the noisy signal X(m,l)—which is possibly additionally changed by a suitable imaging procedure (not shown). In the following step that filter function $H_G^{dyn}(m,l)$ is restricted to a minimum value $\gamma_{SF}(m,l)$, see block 9. That limit—also referred to as the restriction function—is not constant but is determined dynamically in dependence on a direct or indirect representation of the interference noise:

$$\gamma_{SF}(m,l)=f(\hat{N}(m,l)) \tag{8}$$

A representation of the noisy audio signal x(k) can particularly preferably additionally also be used for the calculation of $\gamma_{SF}(m,l)$. The following then applies:

$$\gamma_{SF}(m,l)=f(\hat{N}(m,l),X(m,l)) \tag{9}$$

The following then applies for the filter function $H_b$ which is restricted in that way:

$$H_b = H_G^{dyn}(m, l, \gamma_{SF}(m, l)) = \begin{cases} H_G^{dyn}(m, l) & \text{for } H_G^{dyn}(m, l) > \gamma_{SF}(m, l) \\ \gamma_{SF}(m, l) & \text{other} \end{cases} \tag{10}$$

A suitable linking—for example a multiplication procedure—of a representation X(m,l)of the noisy audio signal s(k) with the previously ascertained restricted filter function $H_b=H_G^{dyn}(m,l,\gamma_{SF}(m,l))$ then supplies a discrete signal $\hat{S}(m,l)$ from which it is possible to derive, by reverse transform corresponding to the transform, a discrete signal sequence $\hat{s}(k)$ which corresponds to the noisy audio signal x(k), but is characterised by a smaller change in respect of time of the statistical properties of the contained noise, see block 6.

FIG. 6 shows a block circuit diagram of a third embodiment of the method according to the invention which serves for the reduction of a random continuous non-stationary noise in an audio signal which is adversely affected by amplitude-modulated noise interference with constant spectral coloration. The discrete spectrum X(m,l) of the noisy audio signal is obtained at the observation time l, see block 10, from the discrete noisy audio signal x(k) by a fast Fourier transform (FFT). X(m,l) is also referred to as the representation form of the noisy audio signal. On the basis of that discrete spectrum X(m,l) an estimate is effected in respect of the auto-noise power density $\hat{\Phi}_{NN}(m,l)$, applicable at the observation time l, which is a measurement in respect of the noise component n(k) in the noisy audio signal x(k). That estimation procedure is effected in two steps:

in a first step, an estimate value $\hat{\Phi}_{NN}(m)$ of the stationary auto-noise power density is ascertained by one of the known estimation procedures, the power density describing the spectral coloration but not the configuration in respect of time of the interference noise, block 22;

then a second step involves ascertaining a parameter which characterises the non-stationary nature of the noise, block 24. For that purpose, there is determined from the estimated auto-noise power density $\hat{\Phi}_{NN}(m)$ and the spectrum X(m,l) of the noisy audio signal a time-variant modulation factor α(m,l) which describes the amplitude modulation of the noise, for example:

$$\alpha(m,l) = \frac{\min(|X(m,l)|^2)}{\min(\hat{\Phi}_{NN}(m))} \tag{11}$$

Multiplication of the estimated stationary auto-noise power density $\hat{\Phi}_{NN}(m)$ by that modulation factor then affords the wanted estimate value $\hat{\Phi}_{NN}(m,l)$ of the actual auto-noise power density $\Phi_{NN}(m,l)$, block 26:

$$\hat{\Phi}_{NN}(m,l)=\alpha(m,l)\cdot\hat{\Phi}_{NN}(m). \tag{12}$$

On the basis thereof, with the incorporation of the current discrete Fourier transforms X(m,l) of the noisy audio signal x(k) the procedure involves determining a filter function $H_G^{dyn}(m,l)$ for the current observation time l by means of a suitable approach, for example by means of the known approach in accordance with Wiener, block 30.

The filter function $H_G^{dyn}(m,l)$ is restricted hereafter by means of a restriction function $\gamma_{SF}(m,l)$ dynamically adapted to the properties of the noise, in terms of its amplitude, which for example from the previously calculated modulation factor α(m,l), in accordance with:

$$\gamma_{SF}(m,l)\sim(\alpha(m,l))^{\beta} \tag{13}$$

with $-5<\beta<+5$; $\beta=-1/2$ is particularly preferred, behaves in proportional manner, block 40.

Then, the dynamically restricted filter function $H_b$ can be determined by means of the restriction function obtained in that way, in accordance with equation (10), block 40.

Then, in a further step, the discrete Fourier transforms of the noisy signal X(m,l) is multiplied by the previously ascertained restricted filter function $H_b$, see block 50. Finally, by inverse fast Fourier transform (IFFT) it is possible to determine from the resulting estimate $\hat{S}(m,l)$ a signal $\hat{s}(k)$, block 60, which corresponds to the noisy audio signal by reduced modulation of the noise, namely a smaller change in respect of time of the statistical properties of the contained noise, and is characterised by a noise reduction which is dependent on the restriction function $\gamma_{SF}(m,l)$.

FIG. 7*a* shows the variation in respect of time of a noise component n(k) which is superimposed on any discrete non-noisy useful component s(k). If a discrete randomly, continuously and non-stationarily noisy audio signal x(k)=s(k)+n(k) which is composed in that way is processed by means of a known method as referred to in the preamble to the description, that affords a noise component which is shown in FIG. 7*b*. If in comparison the audio signal x(k) which has non-stationary noise is processed with the method according to the invention, then, after the processing operation, that gives the resulting noise component shown in FIG. 7*c*, which is of a stationary character which is uniform in relation to time; the typical non-stationarity of the signal, which is present in FIGS. 7*a* and 7*b*, has been successfully eliminated as shown in FIG. 7*c*.

To explain the mode of operation of the method according to the invention, the basic starting point adopted hereinafter will be an audio signal x(k) which is processed in block-wise manner and whose representation X(m,l) corresponds to the square of the block-wise Fourier transform. The audio signal x(k) is to comprise a non-stationary noise n(k) or N(m,l) and is not to contain any useful signal s(k). Accordingly the following applies for the discrete frequency $m_l$ (with i=1,2,3 . . . ) and the discrete times l, which are associated with the individual signal blocks:

$$X(m,l)=N(m_l,l) \tag{14}$$

By way of example, the associated illustrations, FIGS. 8*a*, 9*a* and 10*a*, reproduce the configuration in respect of time N $(m_l,l)$ for a discrete frequency $m_l$.

When using the known method with restricted STSA, taking the stationary estimate of the auto-noise power density $\hat{N}(m_l)$, shown in broken line in FIG. 8*a*, and the noise signal, a filter function $H_G$ is calculated by means of a suitable method (for example in accordance with Wiener), FIG. 8*b*. In the regions in which the real noise representation $N(m_l,l)$ falls below the stationary estimate $\hat{N}(m_l)$, the filter function $H_G(m_l,l)$ assumes a value close to zero and the noise interference is approximately completely suppressed at those times l. In contrast, for those times l in which the representation of the real noise power density $N(m_l,l)$ is greater than the estimate, the filter function $H_G(m_l,l)$ assumes a value of close to one as a part of the current noise signal is interpreted as a useful signal.

If that filter function is limited in accordance with the STSA method to a constant lower limit $\gamma_{SF}(m_l)$ which is therefore invariable in respect of time, that gives a configuration in respect of time as shown in FIG. 8*c*. If the filter function $H_G(m_l,l,\gamma_{SF}(m_l))$ produced in that way is applied to the interference noise signal, that again gives as the output signal a non-stationary residual noise, see FIG. 8*d*.

FIG. 9 represents the diagrammatic mode of operation of the method illustrated in FIG. 8, in which however the representation, which was estimated on a one-off basis and is thus stationary, of the auto-noise power density $\hat{N}(m_l)$, is replaced by a dynamic estimate of the auto-noise power density $N(m_l,l)$, that is to say an estimate which describes the variations in respect of time of the noise. As the filter function $H_G(m_l,l)$ for example by adopting the Wiener approach, there is obtained a function which is fixed by a constant restriction function $\gamma_{SF}(m_l)$ in accordance with equation (7) at a lower limit which is invariable in respect of time, see FIG. 9*c*. If the filter signal is subjected to filtering with the restricted filter function $H_G(m_l,l,\gamma_{SF}(m_l))$, then the processed signal, as shown in FIG. 9*b*, contains a residual noise whose amplitude is markedly reduced in comparison with the amplitude shown in FIG. 8*d*, but in which case the non-stationarity of the noise signal is not removed.

If the method described with reference to FIGS. 9*a* through 9*d* is supplemented by a further step, that gives the method according to the invention as shown in FIG. 10. If the filter function $H_G(m_l,l)$, as shown in FIG. 9*b*, is restricted by means of a restriction function $\gamma_{SF}(m_l,l)$ which is variable in respect of time, for example in accordance with equation (13), it is possible to achieve a residual noise in the output signal, which is almost or completely stationary, and which therefore no longer includes the non-stationarity in respect of time of the signal n(k). The filter function $H_G^{dyn}(m_l,l)$ is determined from the estimate $\hat{N}(m_l,l)$ which describes the change in respect of time of the noise, FIG. 10*a*, and from the noisy signal X(m,l), see FIG. 10*b*. That function is restricted by a restriction function $\gamma_{SF}(m_l,l)$ which is variable in respect of time, in accordance with equation (10), so that this affords the dynamically restricted filter function $H_b=H_G^{dyn}(m_l,l,\gamma_{SF}(m_l,l))$ in accordance with equations (10) and (13), see FIG. 10*c*. Filtering of the input signal with that filter function now results in a processed signal which only still contains a stationary residual noise, see FIG. 10*d*.

What is claimed is:

1. A method of reducing random, continuous, non-stationary noise in a noisy audio signal, comprising:

establishing a dynamic noise component from the noisy audio signal;

establishing a dynamic signal component from the noisy audio signal;

dynamically determining a filter function in response to the dynamic signal component and the dynamic noise component;

dynamically limiting the filter function in response to the dynamic noise component; and applying the filter function to the noisy audio signal and further comprising the steps of:

producing a noise estimate, which describes the time-dependent change of the dynamic noise component, determining an unrestricted filter function $H_G(m,l)$ from the noise estimate;

producing a restriction function $\gamma_{SF}(m,l)$ from the noise estimate;

establishing a restricted filter function $H_G^{dyn}(m,l)$;

setting the restricted filter function $H_G^{dyn}(m,l)$ equal to the greater of the unrestricted filter function $H_G(m,l)$ or the restriction function $\gamma_{SF}(m,l)$; and filtering the noisy audio signal with the restricted filter function $H_G^{dyn}(m,l)$; wherein m is a discrete spectral frequency or equivalent thereof, and l is a discrete time of a signal block in the case of block-wise signal processing.

2. A method as set forth in claim 1, wherein the restriction function $\gamma_{SF}(m,l)$ is produced in dependence in respect of time on the noise estimate which is variable in respect of time of the dynamic noise component.

3. A method as set forth in claim 2 wherein the restriction function $\gamma_{SF}(m,l)$ is produced in dependence in respect of time on the instantaneous noise power which is variable in respect of time of the noise estimate.

4. A method as set forth in claim 1, wherein the restricted filter function is produced in one method step.

5. A method as set forth in claim 1, wherein filtering of the noisy audio signal is executed in the time domain, in the frequency domain or in another mathematically describable signal space.

6. A method as set forth in claim 1, wherein the unrestricted filter function $H_G^{dyn}(m,l)$ is determined in accordance with an approach according to Wiener, in which the mean quadratic error between useful signal and estimate is used as the approximation criterion.

7. A method as set forth claim 1, wherein the unrestricted filter function $H_G^{dyn}(m,l)$ is determined in accordance with the amplitude subtraction method.

8. A method as set forth in claim 1, wherein the noisy audio signal x(k) is transformed into the frequency domain, then the noise component N(m,l) of the transformed noisy audio signal X(m,l) is estimated, the unrestricted filter function $H_G^{dyn}(m,l)$ and the restriction function $\gamma_{SF}(m,l)$ is produced and the restricted filter function $N_b$ is formed therefrom, then the transformed noisy audio signal X(m,l) is multiplied by the restricted filter function $H_b$, and then transformed back into the time domain.

9. A method as set forth in claim 1, wherein the filter function $H_G^{dyn}(m,l)$ is determined by means of a known approach utilizing an estimate $\hat{\Phi}_{NN}(m,l)$ of the instantaneous auto-noise power density.

10. A method as set forth in claim 9 wherein the estimate $\hat{\Phi}_{NN}(m,l)$ of the instantaneous auto-noise power density is determined from a weighting of the estimate $\hat{\Phi}_{NN}(m)$ with a time-dependent weighting factor $\alpha(m,l)$ to give:

$$\hat{\Phi}_{NN}(m,l)=\alpha(m,l)\cdot\hat{\Phi}_{NN}(m).$$

11. A method as set forth in claim 10 wherein the weighting factor $\alpha(m,l)$ is ascertained in accordance with:

$$\alpha(m,l)=\frac{\min(|X(m,l)|^2)}{\min(\hat{\Phi}_{NN}(m))}$$

wherein X(m,l) is a representation of the noisy audio signal.

12. A method as set forth in claim 11 wherein the dynamic restriction function $\gamma_{SF}(m,l)$ is determined as:

$$\gamma_{SF}(m,l)\sim(\alpha(m,l))_{\beta},\text{ with } -5<\beta<5.$$

13. A method as set forth in claim 12 wherein $$\beta=-\tfrac{1}{2}.$$

14. The method of claim 1, further comprising:

sampling an analog audio signal having random, continuous, non-stationary noise; and obtaining the noisy audio signal from the sampled analog audio signal.

15. The method of claim 1, wherein the noisy audio signal is present in discrete form.

16. The method of claim 1, wherein a block includes one or more samples.

* * * * *